(Model.)
W. C. KNOX.
ANIMAL POWER.
No. 266,844. Fig. 1. Patented Oct. 31, 1882.
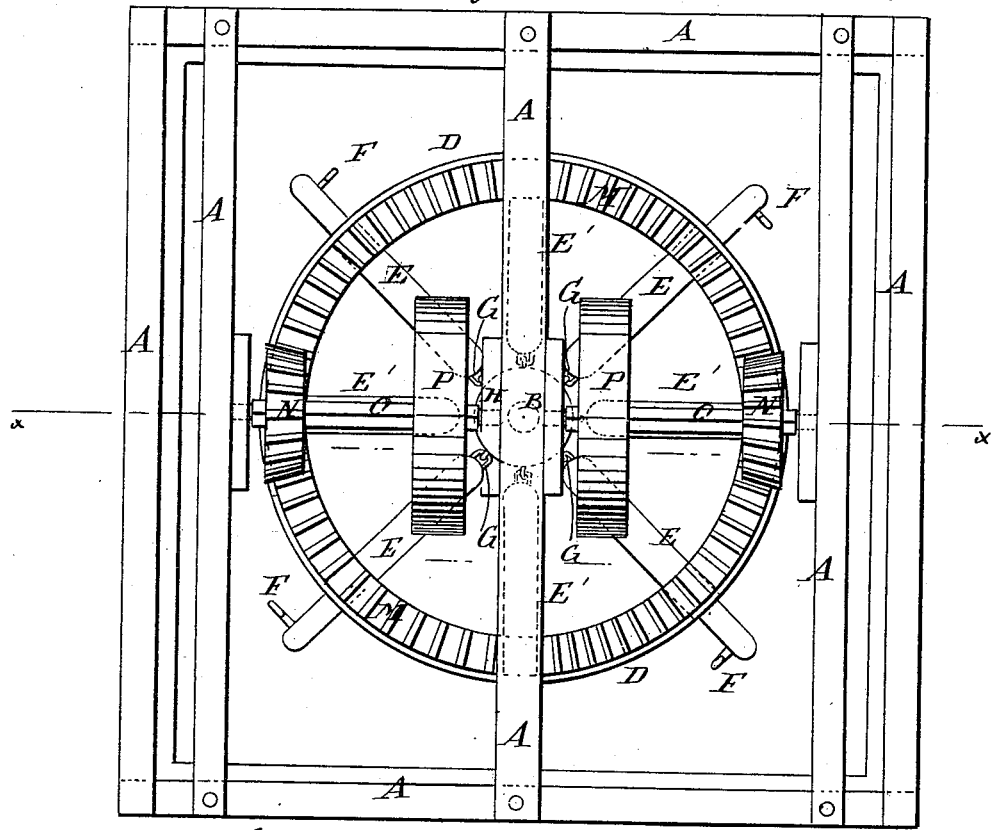
Fig. 2.
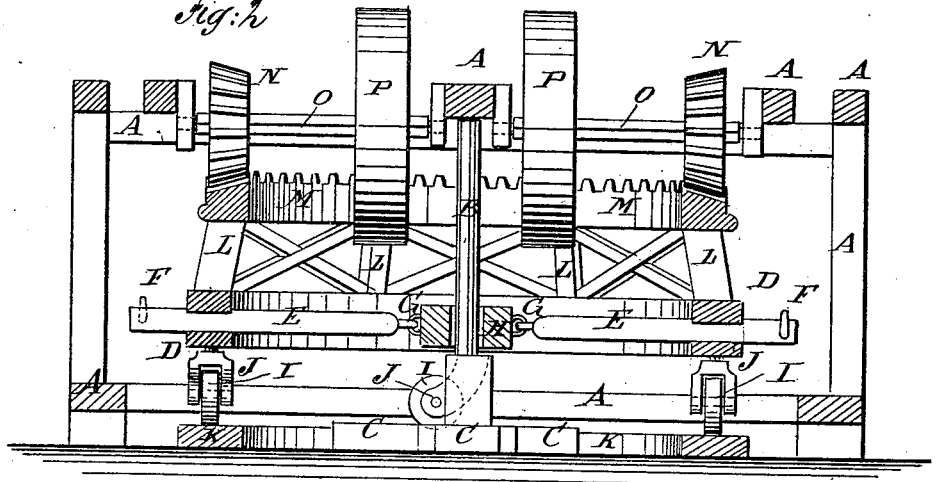
WITNESSES:
Chas. Nida
C. Sedgwick
INVENTOR:
W. C. Knox
BY Munn & Co
ATTORNEYS.

UNITED STATES PATENT OFFICE.

WILLIAM C. KNOX, OF GROESBECK, TEXAS.

ANIMAL-POWER.

SPECIFICATION forming part of Letters Patent No. 266,844, dated October 31, 1882.

Application filed August 21, 1882. (Model.)

*To all whom it may concern:*

Be it known that I, WILLIAM CURTIS KNOX, of Groesbeck, in the county of Limestone and State of Texas, have invented a new and useful Improvement in Animal-Powers, of which the following is a full, clear, and exact description.

Reference is to be had to the accompanying drawings, forming a part of this specification, in which similar letters of reference indicate corresponding parts in both the figures.

Figure 1 is a plan view of my improvement. Fig. 2 is a sectional elevation of the same, taken through the line $x\,x$, Fig. 1, and showing the ends of the sweeps.

The object of this invention is to economize power and promote convenience in the use of animal-powers.

The invention consists in an animal-power constructed with a small wheel placed loosely upon a stationary upright shaft, and connected by hinges with the inner ends of arms and sweeps attached to the main wheel, which is mounted upon caster-wheels to support the weight of the wheel and its attachments. With the main wheel is connected by an interposed frame a large gear-wheel, into the teeth of which, upon the opposite side of its axis, mesh the teeth of two small gear-wheels, each gear-wheel being provided with a driving-pulley, whereby two separate machines can be driven by the same power and at the same time, as will be hereinafter fully described.

A is a frame, which may be the frame of the building in which the power is erected, or a frame built expressly for the machine.

B is an upright rod or shaft, the upper end of which is attached to a cross-bar of the frame A, and its lower end is attached to timbers C, secured to the floor or ground upon which the machine stands.

D is the main wheel, through the rim of which pass and to it are firmly secured the sweeps E and arms E'. The outer ends of the sweeps E project, and to them are attached hooks F for the attachment of the draft. The sweeps E and arms E' are arranged directly opposite each other, and their inner ends are hinged, by staples G, eyebolts, or other suitable means, to a small wheel, H, placed loose upon the upright shaft B. With this construction the wheel H will center the power-wheel D and keep it in place without side strain, the power being applied to the opposite sides of the said wheel D. The weight of the wheel D and its attachments is supported by a number of caster-wheels, I, the standards J of which are swiveled to the rim of the power-wheel D. The caster-wheels I J travel upon a circular track, K, secured to the floor or ground upon which the machine rests.

With the rim of the wheel D is connected by a frame, L, the large gear-wheel M, the said frame L being made of such a height as will raise the gear-wheel M to the desired level.

Into the teeth of the gear-wheel M mesh the teeth of two gear-wheels, N, attached to two horizontal shafts, O, the journals of which revolve in bearings attached to the frame A. The shafts O are radial with respect to the gear-wheel M, and are in line with each other, so that the gear-wheels N will be upon the opposite sides of the wheel M, and will thus exactly balance each other, so that there will be no side strain upon the said wheel.

To the shafts O, near their inner ends, are attached pulleys P to receive belts for driving any desired machinery. With this construction the pulleys P will revolve in opposite directions, and may both be used at the same time for driving different machines; or one of the said pulleys can be used and the other allowed to run idle, the idle-pulley in this case simply balancing the machine and causing it to run true.

Having thus described my invention, I claim as new and desire to secure by Letters Patent—

1. An animal-power constructed substantially as herein shown and described, and consisting of a small wheel placed loosely upon an upright shaft, and connected by hinges with the inner ends of arms and sweeps attached to the main wheel, mounted upon caster-wheels and carrying a large gear-wheel, into the teeth of which, upon the opposite side of its axis, mesh two small gear-wheels, each provided with a driving-pulley, as set forth.

2. In an animal-power, the combination, with the upright stationary shaft B and the arms and sweeps E' E, attached to the main wheel D, of the small loose wheel H and the connecting-hinges G, substantially as herein shown.

and described, whereby the power-wheel is centered, as set forth.

3. In an animal-power, the combination, with the main wheel D and the large gear-wheel M, of an interposed frame, L, substantially as herein shown and described, whereby the said gear-wheel can be brought to any desired level, as set forth.

4. In an animal-power, the combination, with the large gear-wheel M, of the two opposite gear-wheels, N, and the driving-pulleys P, connected with the said gear-wheels, substantially as herein shown and described, whereby two separate machines can be driven by the same power and at the same time, as set forth.

WILLIAM CURTIS KNOX.

Witnesses:
THOMAS J. BROWN,
TRUSTEN SMITH.